Nov. 24, 1970          C. N. BERGLUND          3,543,196
       FILAMENTARY DEVICE COMPRISING THERMORESISTIVE
               MATERIAL AND FILTER UTILIZING SAME
Filed Nov. 16, 1967                           4 Sheets-Sheet 1
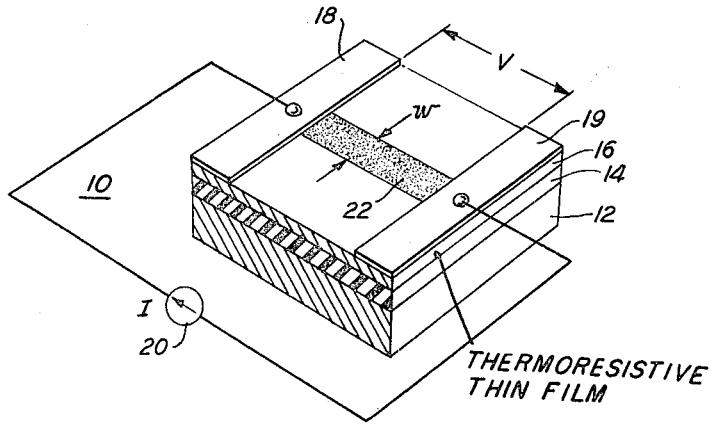
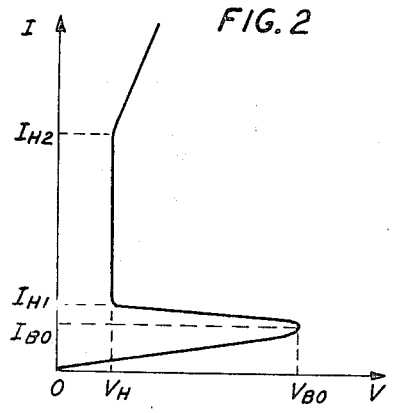
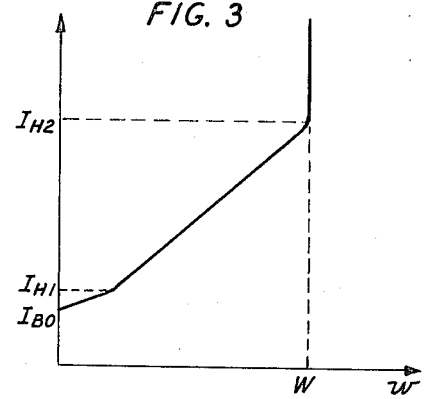
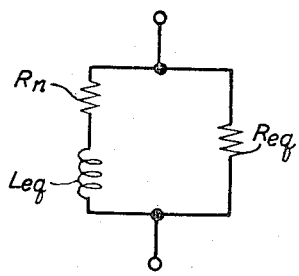
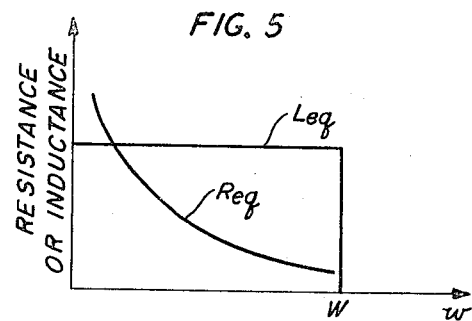
INVENTOR
C. N. BERGLUND
BY
David P. Kelley
ATTORNEY United States Patent Office 3,543,196
Patented Nov. 24, 1970

3,543,196
FILAMENTARY DEVICE COMPRISING THERMO-
RESISTIVE MATERIAL AND FILTER UTILIZING
SAME
Carl N. Berglund, Plainfield, N.J., assignor to Bell Telephone Laboratories, Incorporated, Murray Hill and Berkeley Heights, N.J., a corporation of New York
Filed Nov. 16, 1967, Ser. No. 683,549
Int. Cl. H01l 19/00; H03h 7/02
U.S. Cl. 333—70                               5 Claims

ABSTRACT OF THE DISCLOSURE

A filamentary device employs in general a thin film of a material of the type which exhibits a negative temperature coefficient of resistivity such as a thermoresistive material which, for example, exhibits an abrupt change in resistivity when the material undergoes a metal-semiconductor phase transition. On the thin film are deposited a pair of parallel elongated electrodes in spaced relation to one another. A current source is connected across the electrodes. When the current is maintained between a pair of critical values, a narrow high-temperature filament of low resistivity extending between the electrodes is produced in the film which is normally in its high resistivity state. Within the critical current range, the width of the filament increases with increasing current, but the voltage across the electrodes remains constant. These and other characteristics make the device suitable as a bipolar voltage regulator, a latching relay, a solid state inductor and a negative resistance oscillator.

BACKGROUND OF THE INVENTION

This invention relates to solid state electronic devices and more particularly to filamentary devices which utilize generally materials characterized by a negative temperature coefficient of resistivity and, specifically, thermoresistive materials which undergo a metal semiconductor phase transition.

In variable resistivity materials of the thermoresistive type it has been found that resistivity is highly dependent on the temperature of the material. Such materials are typically characterized by a metal-semiconductor phase transition. That is, there is some transition temperature below which the material is a semiconductor having relatively high resistivity and above which it is a metal having a low resistivity. At this transition temperature, the resistivity of the material changes abruptly, typically by an order of magnitude of about $10^4$. Thermoresistive materials include, for example, vanadium monoxide, vanadium dioxide, vanadium sesquioxide and titanium trioxide which have respective transition temperatures of approximately $-148°$ C., $68°$ C., $-95°$ C. and $327°$ C.

The abrupt change in resistivity has been utilized in the prior art in the construction of a four terminal switch analogous to the electromechanical relay. Two terminals of the switch are connected to the thermoresistive member which is in turn connected in series with a transmission path. The other two terminals are connected to a resistive heater and to a control unit. Passing a current through the heater heats the thermoresistive member and causes the entire member to switch to its low resistivity state. Removing the current causes the entire member to cool and switch back to its high resistivity state. Ideally, of course, a switch should have infinite resistance when OFF and zero resistance when ON; that is, an infinite ratio of OFF to ON resistance. It has generally been thought by those skilled in the art that the OFF-ON ratio for thermoresistive switches was limited to $10^4$ inasmuch as the maximum change in resistivity known is of the order of $10^4$. Furthermore, the prior art thermoresistive switch has no inherent latching capability; that is, in the absence of a control signal applied to the heater, the thermoresistive member switches to its high resistivity state rather than remaining "latched" in its low resistivity state.

SUMMARY OF THE INVENTION

A filamentary device in accordance with the present invention employs generally materials characterized by a negative temperature coefficient of resistivity. One embodiment of the present invention employs a thermoresistive thin film, initially in its low temperature-high resistivity state, on which are deposited a pair of parallel elongated electrodes in spaced relation to one another. A current source is connected across the electrodes. It has been discovered that as the current is increased, the voltage across the electrodes increases until a breakover current level is reached. Above this level and below a certain first critical current level the device exhibits a negative resistance. As the current is increased beyond the breakover level, a narrow high-temperature filament of low resistivity extending between the electrodes is produced. Above the first critical level the width of the filament increases linearly with increasing current, but the voltage across the electrodes remains constant until a second critical current value is reached. Beyond this second current value the voltage again increases with increasing current, but at a much less rapid rate, whereas the width of the filament remains constant. It is to be noted that such filaments can be established in bulk materials as well as thin films.

The existence of the low resistivity filament and the ability to control its width find useful application in several devices, such as a negative resistance oscillator created by biasing the current through the device between the breakover level and the first critical current level.

Furthermore, when the filamentary device is used in conjunction with a resistive heater the combination operates as a four terminal latching relay. The electrodes of the device are connected in series with a transmission path and, as before, the heater is connected to a control unit. A pulse signal applied to the heater from the control unit switches the thermoresistive member from a low temperature-high resistivity-high resistance state to a high temperature-low resistivity state having nearly zero resistance. The zero resistance property arises from a nearly vertical slope of the current-voltage characteristic of the filamentary device in the current range between the aforementioned pair of critical current values. When the signal to the heater is removed, however, a small D.C. current signal on the transmission path is sufficient to maintain the device in its nearly zero resistance state (i.e., the device "latches up"). The zero resistance property makes possible extremely high OFF-ON ratios (approaching infinity) much greater than the OFF-ON resistivity ratio thought by the prior art to represent an upper limit.

Another circuit application which arises from the substantially vertical slope of the current-voltage characteristic is that of voltage regulation. By maintaining the current through the device at a value between the pair of critical values, the voltage across the electrodes remains fixed. The device operates as a bipolar voltage regulator capable of regulating voltages over wide ranges from as low as tenths of a volt to as high as thousands of volts depending on the specific structural dimensions utilized. Advantageously, the device does not require the formation of PN junctions as in prior art regulators and furthermore is readily fabricated in integrated circuit form.

Still another circuit application of the filamentary device is that of a solid state inductor. It has been found that the small signal equivalent circuit of the device comprises to first approximation an inductor in parallel with a resistor. The inductance, typically of the order of tenths of a henry (with microhenries or henries feasible), is constant for all values of filament width except where the filament width is a maximum i.e., at a width equal to the electrode length) at which point the inductance is zero. The resistance on the other hand decreases with increasing filament width. This equivalent inductor has broad application (e.g., in filters) in integrated circuit technology where it has been to date extremely difficult to fabricate a solid state inductor.

BRIEF DESCRIPTION OF THE DRAWINGS

The invention, together with its various features and advantages, can be easily understood from the following more detailed description taken in conjunction with the accompanying drawings, in which:

FIG. 1 is a schematic of one embodiment of the invention;

FIG. 2 is a graph of a current-voltage characteristic which illustrates the primary electrical features of the embodiment of FIG. 1;

FIG. 3 is a graph of current versus filament width for the embodiment of FIG. 1;

FIG. 4 shows an equivalent circuit of the embodiment of FIG. 1;

FIG. 5 is a graph of equivalent inductance and equivalent resistance versus filament width for the embodiment of FIG. 1;

DETAILED DESCRIPTION

Figure 6A:
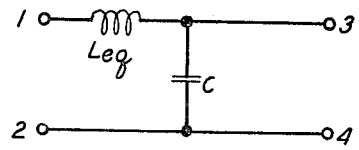
FIG. 6A shows the equivalent circuit of the embodiment of FIG. 6B.

Turning now to FIG. 1, there is shown a filamentary device 10 comprising a thermoresistive (TR) thin film 16 which is thermally coupled, as by an insulator 14, to a heat sink 12. A pair of parallel electrodes 18–19 are deposited in spaced relation to one another on the TR film 16. The deposition may be accomplished by evaporation, sputtering or other techniques well known in the art. Across the electrodes is connected a current source 20. As shown on the graph of FIG. 2, as the current I is increased from zero, the voltage V across the electrodes increases until breakover occurs at a current level $I_{B0}$. Above $I_{B0}$ a further increase in current results in an abrupt decrease in voltage until a first critical current level $I_{H1}$, termed the holding current, is reached. Thus between $I_{B0}$ and $I_{H1}$ the device exhibits a negative resistance. In the range of current between zero and $I_{B0}$ the entire TR film 16 is in a low temperature-high resistivity state, and power is dissipated in the entire TR film 16 causing the film to heat up uniformly. As the transition temperature is reached, the resistivity of the TR film decreases abruptly, causing a corresponding abrupt decrease in the power dissipated in the TR film 16. This lower power dissipation is insufficient to support the entire TR film 16 in its high temperature-low resistivity state because the power density would be too low, but is sufficient to support a narrow filament 22 in that state, the filament extending between the electrodes 18–19 as shown in FIG. 1, inasmuch as the power density in the narrow filament 22 would be proportionally higher. The filament 22 is in a high temperature-low resistivity state, whereas the remainder of the TR film 16 is in a low temperature-high resistivity state. As the current increases beyond $I_{B0}$, the width $w$ of the filament increases nonlinearly until the first critical level $I_{H1}$ is reached (FIG. 3). Beyond $I_{H1}$ the width of the filament increases approximately linearly with increasing current, but the voltage remains fixed at the holding voltage $V_H$ (FIG. 2) until the filament encompasses the entire TR film 16 between the electrodes at a second critical current level $I_{H2}$. It is to be noted that the magnitude of $I_{H2}$ is determined solely by the length of electrodes 18–19, and is not a characteristic of TR film. For further increases in current beyond $I_{H2}$ the width of the filament remains fixed at W, the width of the electrodes 18–19, but the voltage across the electrodes no longer remains constant, rather it increases with increasing current.

A qualitative explanation of the current voltage characteristic shown in FIG. 2 is as follows. Between the current levels zero and $I_{B0}$ the TR thin film has a fixed high resistivity and therefore a fixed high resistance. Thus, increases in current produce increases in voltage in accordance with Ohm's law. At $I_{B0}$ a low resistivity-low resistance filament is formed between electrodes 18–19 as previously described. The abrupt decrease in resistivity of the filament causes the voltage across the electrodes to decrease abruptly as the current flows through the path of least resistance; that is, through the filament. Further increases in current beyond $I_{B0}$ cause increased power dissipation in the TR film 16. The filament, in order to compensate for the increased power dissipation, increases in width thereby maintaining the power density constant. The increased width of the filament, however, represents a decrease in resistance of the filament (the resistivity being fixed at the low value of the TR film). Thus, when the current is being increased beyond $I_{H1}$, the resistance of the filament decreases resulting in the vertical slope-constant voltage characteristic shown in FIG. 2. When the width of the filament can increase no longer; that is, when it equals the width of the electrodes 18–19 at current level $I_{H2}$, the resistance of the filament is fixed so that increases in current beyond $I_{H2}$ again results in increases in voltage.

In order to attain the vertical slope-constant voltage characteristic in the previously described three layered structure, it is preferable that the sensitivity of the thin film material saturate at a low value at high temperatures, i.e., the resistivity should become substanitally constant. This property is inherent in thermo-resistive materials. In addition, it is preferable that the filament width $w$ and the filament length $l$ satisfy the following relationships:

$$\sqrt{t_1 t_3} < W < \frac{k_3 t_1}{k_1} \quad (1)$$

and $$l > \sqrt{t_1 t_3} \quad (2)$$

where $t_1$ and $t_3$ are, respectively, the thicknesses of the insulator and heat sink, and $k_1$ and $k_3$ are, respectively, the thermal conductivities of the insulator and heat sink. In the event, however, that a general material exhibiting a negative temperature coefficient of resistivity is utilized, rather than a thermoresistive material specifically, other structures can be devised to exhibit the vertical slope characteristic without deviating from the spirit and scope of the invention. A similar argument holds in the event that the filament herein described is established in a bulk material rather than a thin film.

BIPOLAR VOLTAGE REGULATOR

The filamentary device 10 operates as a bipolar voltage regulator at the holding voltage $V_H$ when the current through the device is biased between $I_{H1}$ and $I_{H2}$. It is bipolar in the sense that it performs the regulating function for either positive or negative voltage levels. The value of the regulated voltage level $V_H$ may vary over a broad range depending on the dimensions and materials utilized to construct the device 10. For example, for a silicon heat sink 12, a $1\mu$ thick $SiO_2$ insulator 14 and a 1000A. thin film 16 of vanadium dioxide, then $V_H = 1000$ volts for an electrode spacing of 2 cm. and $V_H = 0.2$ volt for an electrode spacing of $4\mu$. In addition, $I_{H1}$ is about 4 ma. for an insulator thermal conductivity of $2 \times 10^{-2}$ watts/cm. C.° and $VO_2$ resistivity of $2 \times 10^{-4}$ ohm. cm in the high temperature state. $I_{H2}$ is about 400 ma. for an electrode length of about $410\mu$.

SOLID STATE INDUCTOR

For the constant voltage region of operation between $I_{H1}$ and $I_{H2}$, the device 10 presents a low impedance to low frequency signals and a high impedance to high frequency signals. The small signal equivalent circuit of the thermoresistive device 10, shown in FIG. 4, comprises basically a resistor $R_{eq}$ in parallel with the series combination of an inductor $L_{eq}$ and another resistor $R_n$ which may be positive, negative or zero, but is less than $R_{eq}$. The device 10 is in effect, therefore, a solid state inductor as well as a voltage regulator as previously described. As shown in FIG. 5, the inductance $L_{eq}$ is constant with varying filament width except where the width is a maximum for the particular structure at which point $L_{eq} = 0$. The resistance $R_{eq}$ on the other hand decreases with increasing filament width. Solution of the heat flow equations for the device 10 yields to a first approximation of the following equations for $R_{eq}$, $L_{eq}$ and $R_n$:

$$R_{eq} = V/I = \frac{\rho_H l}{t_2 W} \quad (3)$$

in ohms $$L_{eq} = \frac{C \rho_H l}{8 \sqrt{k_1 k_2}} \sqrt{\frac{t_1}{t_2}} \quad (4)$$

in henries, and $$R_n = -R_{eq} \frac{\sqrt{k_2}}{4} W_e - \sqrt{k_2} W \quad (5)$$

in ohms where C is the specific heat of both the TR film 16 and the insulator 12; $\rho_H$ is the resistivity of the TR film in its low resistivity state; $l$ is the electrode spacing; W is the electrode length; $k_2$ and $k_1$ are the thermal conductivities of the TR film 16 and the insulator 12, respectively; and $t_2$ and $t_1$ are the thicknesses of the TR film 16 and the insulator 12, respectively. In a typical example, the heat sink is silicon, the insulator is $SiO_2$ and the TR film is vanadium dioxide. Other substrates and insulators are, of course, available, e.g., tantalum and tantalum oxide ($Ta_2O_5$), respectively. Illustrative parameter values are $t_1 = 1 \mu$, $t_2 = 1000$ Å, $l = 1$ cm., $W = 3 \mu$, $C = 4$ joules/C.° cm.³, $k_1 = k_2 = 1 \times 10^{-2}$ watts/cm. C.°, $\rho_H = 2 \times 10^{-4}$ ohm-cm. for which $L_{eq} = 30$ mh., $R_{eq} = 0.67 \times 10^5$ ohms, and $R_n \approx 0$. Other similar structures with, however, only about 3–4 mils electrode spacing have been constructed and have the following parameter values; $L_{eq} = 20$ mh., $Q = 10$ at 10 kHz and at 4 kHz when biased at 2 volts and 2 ma.

From a qualitative point of view the inductive effect can be explained as follows. In the constant voltage region of the I-V characteristic, the filament attempts to compensate for minute changes in voltage by changing its width and thereby changing the impedance of the filament between electrodes. These changes are in such a direction as to maintain the voltage constant, but of course the impedance changes inherently lag the voltage changes. This phenomenon is analogous to the operation of an inductor in which changes in current always lag changes in voltage.

LOW PASS FILTER

Figure 6B:
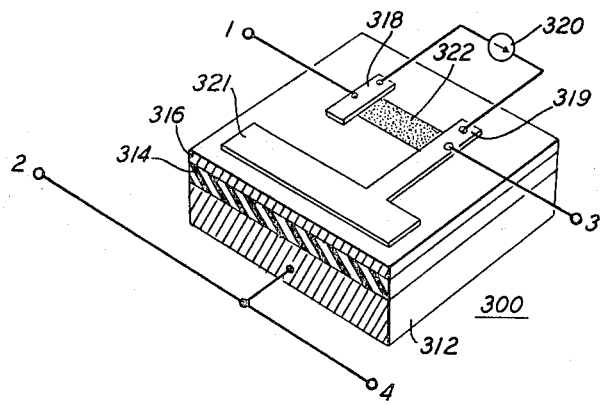
FIG. 6B is a schematic of a second embodiment of the invention.
Figure 6C:
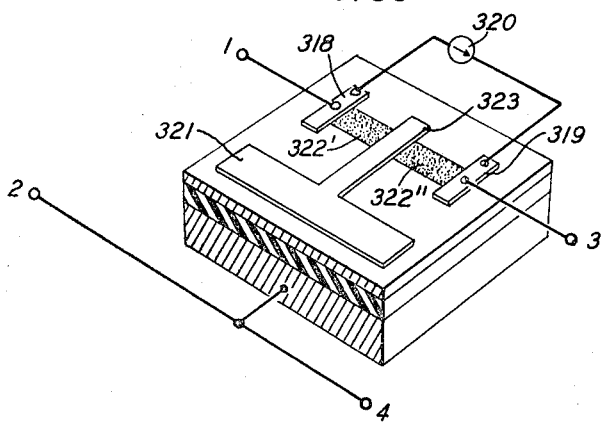
FIG. 6C is another embodiment of the invention.

A typical circuit application of the solid state inductor is in a low pass filter as shown in FIG. 6B. The approximate lumped circuit equivalent is shown in FIG. 6A, the equivalent inductor $L_{eq}$ being connected in series between terminals 1 and 3 and the capacitor C being connected across terminals 3 and 4. This circuit is embodied in thin film form as shown in FIG. 6B. The filter structure 300 is basically the same as shown in FIG. 1, comprising a substrate 312 (e.g., tantalum) upon which have been deposited an insulator 314 (e.g., tantalum oxide) and a thermoresistive thin film 316 (e.g., vanadium dioxide) in the order recited. A pair of electrodes 318–319 are formed on the thin film 316 and a current source 320 is connected to terminal 3, and the substrate 312 is connecting between the electrodes in the manner previously described. One of the electrodes is connected to terminal 1 and the other to terminal 3, the filament exhibiting the inductance $L_{eq}$ and therefore being "connected" between terminals 1 and 3 as in FIG. 6A. The capacitor C is fabricated by depositing a large area metal plate 321 on the film 316. The plate 321 and the substrate 312 form the plates of capacitor C, the insulator 314 being the capacitor dielectric. To complete the filter circuit, the plate 321 is connected to the electrode 319 (or, as shown, the plate 321 and electrode 319 may be an integral unit) which is connected to terminal 3, and the substrate 312 is connected to terminals 2 and 4. Although not shown, the thickness of insulator 314 under the plate 321 may be different from the thickness under the electrodes 318–319 in order to create a desired magnitude of capacitance.

The filter circuit of FIGS. 6A and 6B is a basic building block and may be readily cascaded or otherwise interconnected with other similar structures to form $\pi$ filters, "T" filters and the like. Alternatively, a T filter, as shown in FIG. 6B for example, may be fabricated by the addition of another electrode 323 intermediate the pair of electrodes 318–319, in which case the capacitor electrode 321 is connected to the intermediate electrode 323.

Figure 6D:
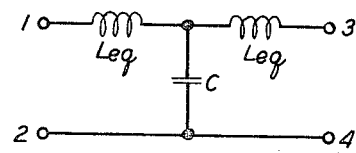
FIG. 6D is the equivalent circuit of the embodiment of FIG. 6C.

Thus, the filament 322 of FIG. 6B is in effect "divided" into two similar filaments 322' and 322", filament 322' extending between electrodes 318 and 323 and filament 322" extending between electrodes 319 and 323. Referring to FIG. 6D, the two filaments are therefore a pair of inductors is "connected" in series between terminals 1 and 3. The capacitor C is "connected" between the junction point of the inductors and terminals 2 and 4.

LATCHING RELAY

Figure 7:
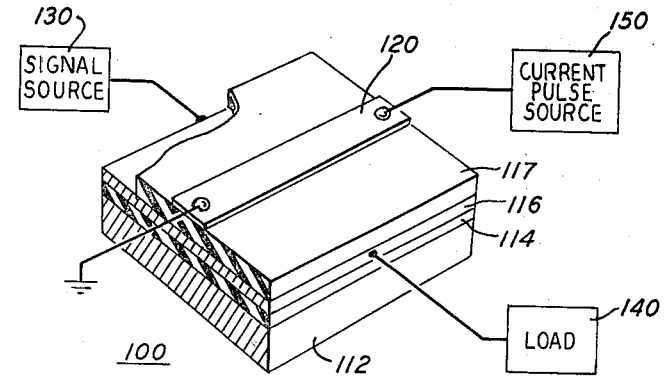
FIG. 7 is a schematic of still another embodiment of the invention.

The filamentary device functions as a latching relay when coupled to a heater as shown in FIG. 7. The latching relay 100 comprises a heat sink 112 upon which have been deposited an insulator 114, a TR thin film 116 and another insulator 117, in the order recited. The thin film is generally a material which exhibits a negative temperature coefficient of resistivity. The TR film 116 is connected in series between a signal source 130 and a load 140. A narrow heater 120, not coexpansive with the TR film 16, is deposited on the insulator 117 and is connected to an appropriate control unit, e.g., between a current pulse source 150 and ground.

Figure 8:
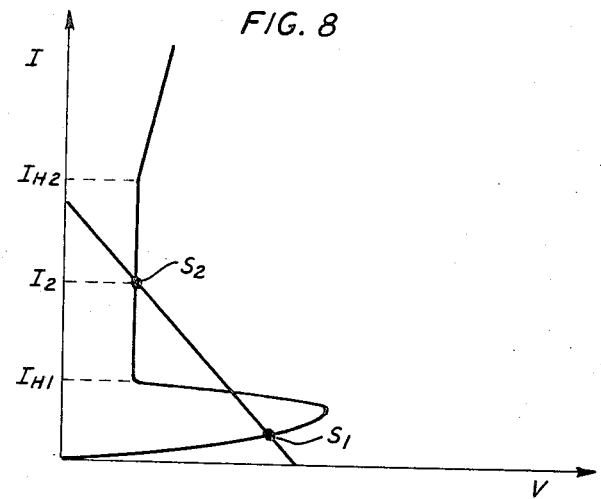
FIG. 8 is a graph of the operating characteristics of the invention as shown in FIG. 7.

The operation of the latching relay is easily understood with reference to FIG. 8. The relay is OFF in state $S_1$, the entire TR film 116 being in its high resistivity-high resistance state. Ideally, therefore, no current passes from signal source 130 to load 140. The relay is switched ON by the application to the heater 120 of a current pulse supplied by source 150. The heat generated by current flow in heater 120 is thermally coupled to TR film 116 through insulator 114 and produces a narrow filament of low resistivity under the heater 120. This filament possesses all the current-voltage characteristics previously described. The current pulse switches the relay to a low resistivity state $S_2$ thereby allowing substantial current to flow from source to load. When the current pulse is removed, the relay is maintained in its low resistivity-low resistance state by the current flow from source to load; that is, the relay "latches." The magnitude of current required to latch the relay corresponds to the level $I_2$, as shown on FIG. 8. The relay is turned OFF again, as with any latching relay, by interrupting the flow of current from source to load.

Figure 9:
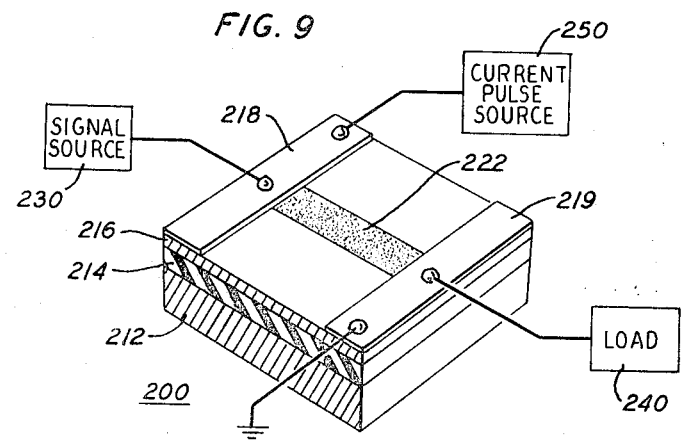
FIG. 9 is a schematic of yet another embodiment of the invention.

Another embodiment of the latching relay, shown in FIG. 9 requires no external heater. Rather a filament in the TR film is produced by passing a current directly through the film. The relay 200 comprises, as before, a heat sink 212 upon which have been deposited an insulator 214 and a TR film 216 in the order recited. A pair of electrodes 218–219, deposited on the TR film 216, are connected in series between a signal source 230 and a load 240. In addition the electrodes are connected in series between a current pulse source and ground.

In operation, a current pulse of magnitude between $I_{H1}$ and $I_{H2}$ produces a filament in TR film 216 thereby allowing current to flow from source 230 to load 240, i.e., the relay is closed. The load current is so adjusted in magnitude that, in the absence of current from pulse source 250, the filament is maintained, i.e., the relay remains closed or "latches up."

NEGATIVE RESISTANCE OSCILLATOR

Figure 10:
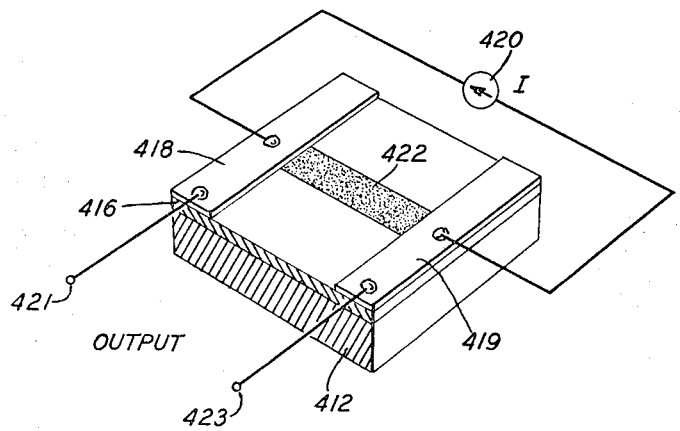
FIG. 10 is a schematic of another embodiment of the invention.
Figure 11:
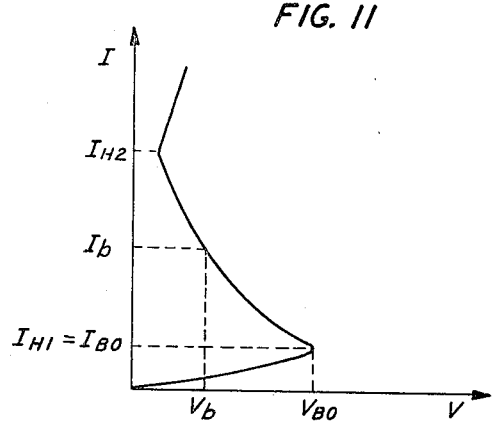
FIG. 11 is a graph of the operating characteristics of the invention of FIG. 10.

In still another embodiment the filamentary device functions as a negative resistance oscillator. Referring to FIG. 10, the oscillator 400 comprises a TR film 416 (in general a material exhibiting a negative temperature coefficient of resistivity) thermally coupled to a "semi-infinite" heat sink 12. The thermal coupling is accomplished, for example, as shown in FIG. 10 by depositing the TR film directly on the substrate, there being no intervening insulator. A pair of electrodes 418–419 are deposited on the TR film 416 and a filament 422 is established, as before, by connecting a current source 420 across the electrodes. The insulator is omitted inasmuch as its presence tends to suppress the negative resistance characteristic of the device. The effect can be seen readily by comparing the I–V characteristics of FIGS. 1 and 11. The three layer device corresponding to FIG. 1 exhibits a very small negative resistance when biased between $I_{B0}$ and $I_{H1}$, whereas the two layer device corresponding to FIG. 11 exhibits a pronounced negative resistance over a much broader range of current from $I_{H1}=I_{B0}$ to $I_{H2}$. Thus, by merely biasing the current from source 420 between $I_{H1}$ and $I_{H2}$ (e.g., at $I_b$) oscillations are produced across output terminals 421–423 at a frequency which is a function of the materials and structural dimensions used. For example, such an oscillator has been constructed using a 700 A. thick TR film of $VO_2$, a 20 mil thick sapphire heat sink and a 20 mil electrode spacing. When biased as 3 ma. and 100 volts, relaxation (nonsinusoidal) oscillations at 60 Hz. and about 150 mw. were produced. It is noted that the previously discussed three layer device can still function as an oscillator but the effect would be much smaller due to the smaller negative resistance. Advantageously, the invention requires the formation of no PN functions necessary to do so many prior art negative resistance oscillators such as the tunnel diode, for example.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:
1. A filamentary device comprising a first layer of a material characterized by a negative temperature coefficient of resistivity and in which can be established a low resistivity filament,
   a substrate, an insulative layer formed on one surface of said substrate, said first layer being formed on the free surface of said insulative layer,
   a pair of electrodes deposited on one surface of said first layer in spaced relation to one another,
   means for establishing a low resistivity filament in said first layer extending between said electrodes, said filament being characterized by the property that between a pair of critical current levels the width thereof increases with increasing current whereas the voltage across said electrodes remains nearly fixed, and
   means for passing through said first layer a first current in the range between the pair of critical current levels.
2. The filamentary device of claim 1 wherein said first layer comprises a thermoresistive material characterized by a metal-semiconductor phase transition.
3. The device of claim 1 for use as a four terminal filter, in combination with a third electrode deposited on said first layer, said pair of electrodes being connected in series between two of said terminals, said third electrode being connected to one of said two terminals, and said substrate being connected to the remaining two of said terminals.
4. The device of claim 1 for use as a four terminal filter, in combination with a third electrode deposited on said first layer intermediate said pair of electrodes, said pair of electrodes being connected in series between two of said terminals, a fourth electrode deposited on said layer, said fourth electrode being connected to said third electrode, and said substrate being connected to the remaining two of said terminals.
5. The device of claim 1 wherein to a first order approximation the following relationships are satisfied:

$$\sqrt{t_1 t_3} < w < \frac{k_3 t_1}{k_1}$$

and $l > \sqrt{t_1 t_3}$ where $t_1$ and $t_3$ are, respectively, the thicknesses of said insulative layer and said substrate, $k_1$ and $k_3$ are, respectively, the thermal conductivity of said insulative layer and said substrate, and $w$ and $l$ are the width and length, respectively, of said filament.

References Cited

UNITED STATES PATENTS 3,469,154  9/1969  Scholer.

PAUL L. GENSLER, Primary Examiner

U.S. Cl. X.R.

307—299, 324; 317—234; 333—80; 336—200, 232